(12) United States Patent
Sekine

(10) Patent No.: US 12,334,061 B2
(45) Date of Patent: *Jun. 17, 2025

(54) CONVERSATION ANALYSIS SYSTEM

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 18/536,220

(22) Filed: Dec. 11, 2023

(65) Prior Publication Data

US 2024/0105168 A1 Mar. 28, 2024

Related U.S. Application Data

(63) Continuation of application No. 17/614,375, filed as application No. PCT/JP2021/001581 on Jan. 19, 2021, now Pat. No. 11,881,212.

(30) Foreign Application Priority Data

Jan. 29, 2020 (JP) .................................. 2020-013067

(51) Int. Cl.
 *G10L 15/18* (2013.01)
 *G10L 15/187* (2013.01)
 *G10L 15/22* (2006.01)

(52) U.S. Cl.
 CPC ........ *G10L 15/1815* (2013.01); *G10L 15/187* (2013.01); *G10L 15/22* (2013.01)

(58) Field of Classification Search
 CPC .... G10L 15/1815; G10L 15/187; G10L 15/22
 See application file for complete search history.

(56) References Cited

U.S. PATENT DOCUMENTS

| 8,065,155 | B1 * | 11/2011 | Gazdzinski | G06Q 30/0256 704/7 |
|---|---|---|---|---|
| 11,120,226 | B1 * | 9/2021 | Nudd | G06F 40/30 |
| 11,282,124 | B1 * | 3/2022 | Yoon | G06Q 30/0631 |
| 2008/0235018 | A1 * | 9/2008 | Eggen | G10L 15/26 704/E15.045 |

(Continued)

FOREIGN PATENT DOCUMENTS

| CN | 106573375 A | * | 4/2017 | ............. B25J 11/00 |
|---|---|---|---|---|
| JP | 2004264464 A | * | 9/2004 | |
| WO | WO-2018221120 A1 | * | 12/2018 | ........... G06F 16/332 |

*Primary Examiner* — Paras D Shah
*Assistant Examiner* — Oluwadamilola M Ogunbiyi
(74) *Attorney, Agent, or Firm* — Pyprus Pte Ltd; George D. Liu

(57) ABSTRACT

To provide a system capable of correcting an error in speech recognition by easier work than in the prior art. A conversation analysis system comprising: a speech analysis unit 3 for analyzing contents contained in a conversation; a topics grasping unit 5 for grasping topics of the conversation; a topics-related correction terms storage unit 7 for, with respect to the respective topics, storing pronunciations to be speech-recognized or speech-recognized terms, and candidates for correction terms related to the pronunciations to be speech-recognized or the speech-recognized terms; and a conversation correction unit 9 for correcting the conversation analyzed by the speech analysis unit 3.

7 Claims, 2 Drawing Sheets

(56) References Cited

U.S. PATENT DOCUMENTS

| | | | |
|---|---|---|---|
| 2009/0043584 A1* | 2/2009 | Philips | G10L 13/08 |
| | | | 704/260 |
| 2009/0076798 A1* | 3/2009 | Oh | G10L 15/1815 |
| | | | 704/9 |
| 2009/0083255 A1* | 3/2009 | Li | G06F 16/951 |
| | | | 707/999.005 |
| 2009/0306979 A1* | 12/2009 | Jaiswal | G10L 15/063 |
| | | | 704/235 |
| 2010/0180198 A1* | 7/2010 | Iakobashvili | G06F 40/232 |
| | | | 715/257 |
| 2010/0185640 A1* | 7/2010 | Dettinger | H04L 51/52 |
| | | | 707/758 |
| 2014/0046891 A1* | 2/2014 | Banas | G06N 5/022 |
| | | | 706/46 |
| 2015/0006170 A1* | 1/2015 | Caskey | G09B 19/06 |
| | | | 704/235 |
| 2015/0347823 A1* | 12/2015 | Monnerat | G06V 20/10 |
| | | | 382/218 |
| 2016/0170971 A1* | 6/2016 | McSherry | G06F 40/274 |
| | | | 704/9 |
| 2018/0068659 A1* | 3/2018 | Ikeno | G10L 15/01 |
| 2019/0266250 A1* | 8/2019 | Toplyn | G10L 15/26 |
| 2019/0319898 A1* | 10/2019 | Scanlon | G06N 5/01 |
| 2019/0332657 A1* | 10/2019 | Jones | G16H 30/40 |
| 2019/0385711 A1* | 12/2019 | Shriberg | G09B 19/00 |
| 2020/0043479 A1* | 2/2020 | Mont-Reynaud | G06F 40/58 |
| 2020/0059559 A1* | 2/2020 | Mazza | G06F 16/367 |
| 2020/0066264 A1* | 2/2020 | Kwatra | G10L 25/63 |
| 2020/0090648 A1* | 3/2020 | Wambugu | G10L 25/48 |
| 2020/0175961 A1* | 6/2020 | Thomson | G10L 15/28 |
| 2020/0243094 A1* | 7/2020 | Thomson | G10L 15/28 |
| 2020/0311208 A1* | 10/2020 | Koohmarey | G06N 3/004 |
| 2021/0004441 A1* | 1/2021 | Sapugay | G06N 5/01 |
| 2021/0058264 A1* | 2/2021 | Fahrendorff | H04L 12/1822 |
| 2021/0142791 A1* | 5/2021 | Penta | G10L 15/1815 |
| 2021/0241755 A1* | 8/2021 | Kadono | G06N 5/04 |
| 2021/0258424 A1* | 8/2021 | Brown | G06Q 30/01 |
| 2022/0115001 A1* | 4/2022 | Bratt | G10L 15/22 |

\* cited by examiner

CONVERSATION ANALYSIS SYSTEM

RELATED APPLICATIONS

The present invention is a continuation application of U.S. patent application Ser. No. 17/614,375 filed Nov. 26, 2021, which is a national phase application of International patent application no. PCT/JP2021/001581, filed Jan. 19, 2021, which claims the benefit of Japanese patent application no. 2020-013067, filed Jan. 29, 2020, the disclosure of which is incorporated in its entirety.

TECHNICAL FIELD

The present invention relates to a conversation analysis system.

BACKGROUND ART

JP2017-167368A discloses a voice recognition error correction device. In order to correct a character string to be corrected which is included in a first text, this device recognizes a second uttered voice and estimates a character string to be corrected on the basis of text matching between the first text and a second text. Such correction devices from the prior art corrected voice recognition errors using a general correction engine regardless of the field or content of the conversation. Therefore, the correction accuracy of such conventional correction devices was not sufficient.

PRIOR ART DOCUMENTS

Patent Documents

Patent Document 1: JP2017-167368A

SUMMARY OF INVENTION

Technical Problem

An object of one invention disclosed in this specification is to provide a system with which voice recognition errors can be corrected by an easier operation compared to the prior art.

Solution to Problem

One invention described in the present specification is based on the finding that if the field and summary of the conversation are ascertained, then speech terms which are easily misrecognized can also be ascertained, and thus more accurate and prompt correction of voice recognition errors can be achieved.

One invention described in the present specification relates to a conversation analysis system 1. The conversation analysis system 1 includes a voice analysis unit 3, a topic-related correction term storage unit 7, a topic ascertaining unit 5, and a conversation correction unit 9.

The voice analysis unit 3 is an element for analyzing the content included in a conversation.

The topic ascertaining unit 5 is an element for ascertaining a topic of the conversation.

The topic-related correction term storage unit 7 is an element for storing, for each topic, pronunciations to be voice-recognized or terms that are voice-recognized, and candidates of correction terms related to the pronunciations to be voice-recognized or the terms that are voice-recognized.

The conversation correction unit 9 is an element for correcting the conversation analyzed by the voice analysis unit 3. The conversation correction unit 9 uses the topic of the conversation ascertained by the topic ascertaining unit 5 to read the correction term candidates from the topic-related correction term storage unit 7 and correct the conversation analyzed by the voice analysis unit 3.

A preferred example of the conversation analysis system further includes a topic-related term update unit 13 for updating the topic-related correction term storage unit 7. The topic-related term update unit 13 uses information related to each topic input into the system to update the correction term candidates.

A preferred example of the conversation analysis system further includes a topic information extraction unit 11 that extracts information related to a topic. The topic information extraction unit 11 uses voice information obtained when the voice analysis unit 3 analyzes a presentation input into the system 1 and a presentation material input into the system to extract the information related to each topic input into the system.

One invention described in the present specification relates to a program for a conversation analysis system. The program causes a computer to function as a voice analysis means, a topic-related term storage means, a topic ascertaining means, and a conversation correction means. These means correspond respectively to the units described above.

Effects of Invention

According to one invention described in the present specification, a system with which voice recognition errors can be corrected by an easier operation compared to the prior art can be provided.

DESCRIPTION OF EMBODIMENTS

In the following, embodiments for carrying out the present invention shall be described using drawings. The present invention is not limited to the embodiments described below, and may be appropriately modified from the embodiments below within a scope that would be obvious to a person skilled in the art.

Figure 1:
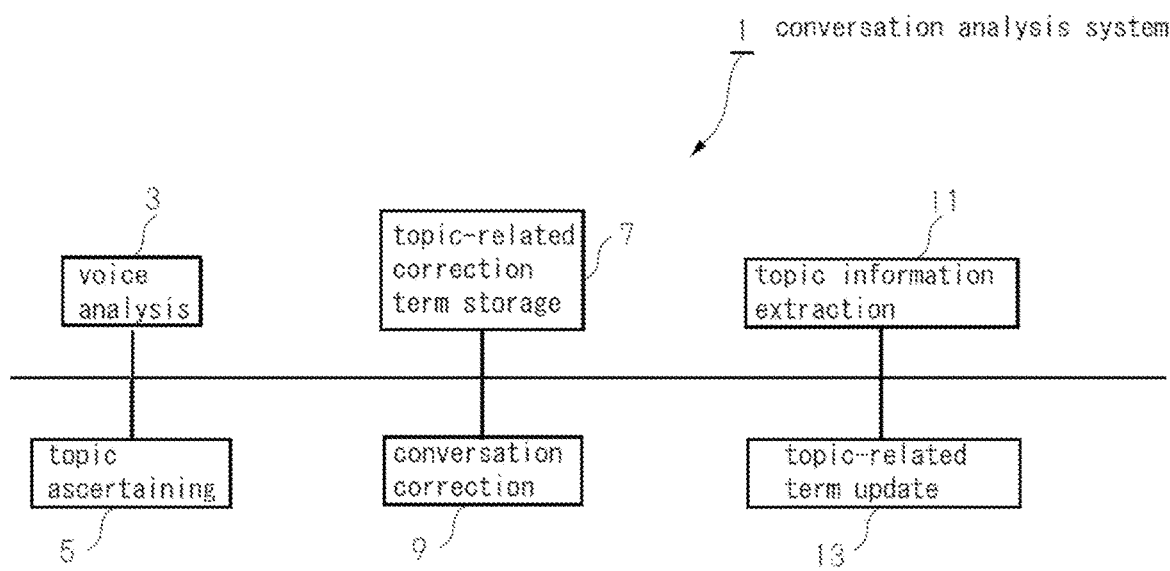
FIG. 1 is block diagram illustrating an overview of a conversation analysis system.

FIG. 1 is block diagram related to a conversation analysis system. As shown in FIG. 1, the conversation analysis system 1 includes a voice analysis unit 3, a topic ascertaining unit 5, a topic-related correction term storage unit 7, and a conversation correction unit 9. Further, as shown in FIG. 1, the system 1 may also include a topic information extraction unit 11 and/or a topic-related term update unit 13. The system 1 may also include other elements beside those above as appropriate.

Figure 2:
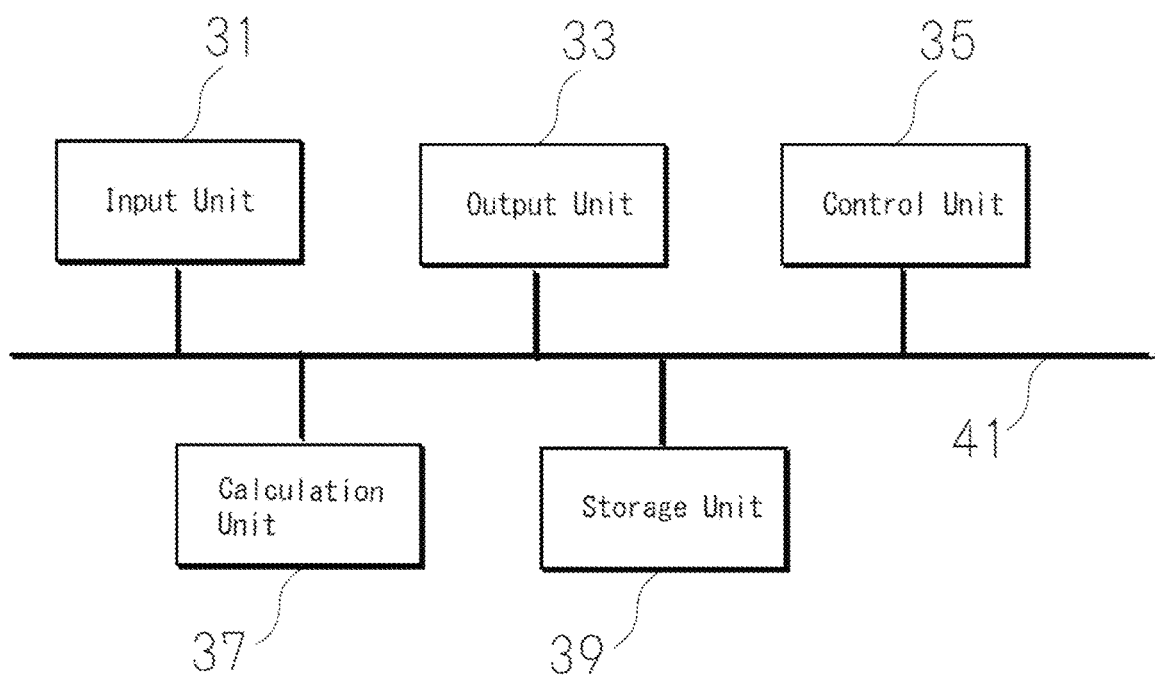
FIG. 2 is a block diagram illustrating the basic configuration of a computer.

FIG. 2 is a block diagram illustrating the basic configuration of a computer. As shown in FIG. 2, the computer includes a processor embedded with an input unit 31, an output unit 33, a control unit 35, and a calculation unit 37, and a memory embedded with a storage unit 39, and these elements are connected by a bus 41 or the like so that information can be exchanged therebetween. For example, in the storage unit, a control program may be stored, and various types of information may also be stored. If a prescribed piece of information is input from the input unit, the control unit reads the control program stored in the storage unit. The control unit then reads, as appropriate, the information stored in the storage unit, and transmits the information to the calculation unit. The control unit also transmits, to the calculation unit, information that has been input as appropriate. The calculation unit performs a calculation process using the various pieces of received information, and stores the result in the storage unit. The control unit reads the calculation result that was stored in the storage unit, and the result is output from the output unit. In this way, various processes are executed. Each element explained below may correspond to one of the elements of the computer.

Figure 3:
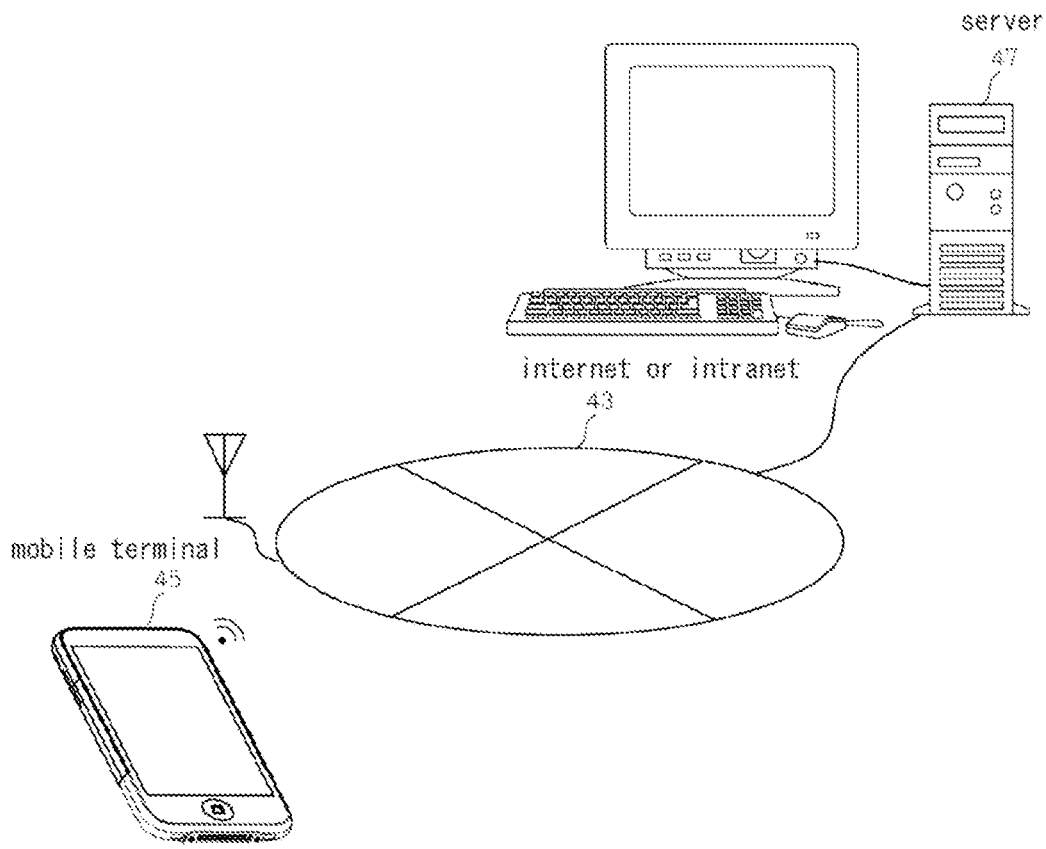
FIG. 3 is a schematic view illustrating an example of the system of the present invention.

FIG. 3 is a schematic view illustrating an example of the system of the present invention. As shown in FIG. 3, the system of the present invention (a system comprising a device of the present invention) may include a mobile terminal 45 that is connected to an internet or intranet 43, and a server 47 that is connected to the internet or intranet 43. Of course, a single computer or mobile terminal can function as a device of the present invention, and there may be a plurality of servers.

The voice analysis unit 3 is an element for analyzing the content included in a conversation. The voice analysis unit 3 is an element for analyzing the content of a conversation.

Figure 4:
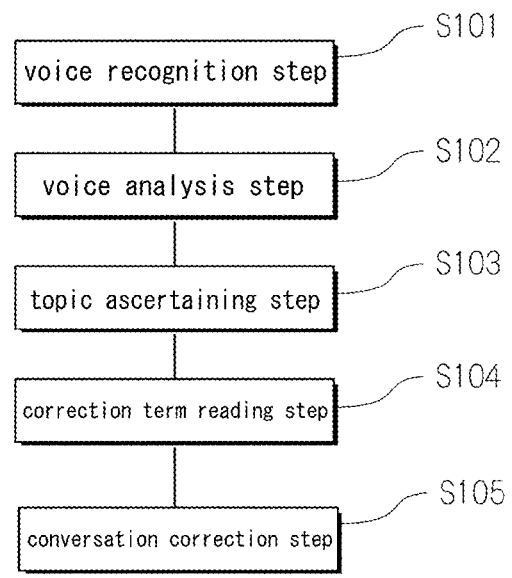
FIG. 4 is a flowchart illustrating an example of the processing of the present invention.

FIG. 4 is a flowchart illustrating an example of the processing of the present invention. When a conversation occurs, voice recognition is carried out by a voice recognition unit of the system (voice recognition step: S101).

The conversation is input into the system 1 from the input unit 31 such as a microphone of the system 1. The conversation which is input is stored, as appropriate, in the storage unit 39 of the system 1. The conversation may be converted to digital information and then stored in the storage unit 39. The voice analysis unit 3 is an element for reading the conversation stored in the storage unit 39, and analyzing the words or conversation sentences included in the conversation. Such a voice analysis unit (voice analysis system) is publicly known.

For example, consider a case in which a certain conversation is conducted between a doctor and a patient. The conversation is converted to digital information and stored in the storage unit. The voice analysis unit 3 reads the conversation information from the storage unit and analyzes the conversation information as shown below. First, voice information based on the following conversation is input from a microphone which serves as the input unit 31 of the system, and the voice information is stored by voice recognition in the storage unit 39 as shown below.

"As a result of examination, there is a strong possibility that the disease you are suffering from is fibromyalgia. Fibromyalgia is an illness accompanied by aches and pains that occur at multiple places throughout the body. I am going to prescribe you Lyrica, which is an ingestible medicine that alleviates pain caused by fibromyalgia. Please take it two times per day, after breakfast and after dinner."

Next, the conversation that was voice-recognized is voice analyzed (voice analysis step: S102).

For example, voice information based on the above conversation is analyzed as shown below by the voice analysis unit 3, and stored as a voice-analyzed conversation in the storage unit 39.

Doctor: "As a result of examination, there is a strong possibility that the disease you are suffering from is fiber my algae. Fiber mv algae is an illness accompanied by aches and planes that occur at multiple places throughout the body. I am going to prescribe you rear a car, which is an ingestible medicine which alleviates pain caused by fiber my algae. Please bake it two times per day, after breakfast and after dinner."

Next, a topic related to the conversation is ascertained (topic ascertaining step: S103).

In this step, the topic ascertaining unit 5 ascertains the topic of the conversation. Therein, if the system 1 is being used by a doctor, topics in which the conversation content is medically related, such as topics related to psychiatry if the doctor is a psychiatrist, can be input into the system 1 in advance. In such a case, information related to the topics that have been input may be stored in advance in the storage unit 39 of the system 1, and when a conversation between the doctor and a patient begins, such topic-related information may be read from the storage unit. Further, topics related to a patient suffering from pain and fibromyalgia may be input into the system 1 by, for example, a receptionist, a nurse, or a doctor on the basis of the patient's diagnosis chart or the like. The system 1 may also include the topic information extraction unit 11 to be explained below, so that the conversation topic can be automatically extracted from the conversation content. In addition, the conversation topic can be automatically extracted from the conversation content using the correction term candidates stored in the topic-related correction term storage unit 7 or terms corresponding to these correction term candidates. In this case, even if terms representing the correct topic are not analyzed by the voice analysis alone, the topic can be surmised by using the pre-correction terms of the correction term candidates, and thereby the correct topic can be extracted (or determined). In other words, if pronunciations to be voice-recognized or terms that are voice-recognized are pre-correction terms of the correction terms, the topic can be accurately extracted by surmising candidates of the correction terms.

The system 1 may also include a topic dictionary in the storage unit. The topic ascertaining unit 5 can ascertain the topic from the conversation by reading topic words stored in the topic dictionary, and performing matching to determine whether a topic word matches a term included in a conversation that was input by the microphone, etc. or a conversation that was analyzed by the voice analysis unit 3.

Next, candidates of correction terms related to the topic are read from the storage unit (correction term reading step: S104).

For example, if a receptionist of a medical institution inputs fibromyalgia into the system 1 within the medical institution, in a terminal 1 near a doctor, fibromyalgia is read as the topic from the storage unit. The topic-related correction term storage unit 7 stores, for each topic, pronunciations to be voice-recognized or terms that are voice-recognized, and candidates of correction terms related to the pronunciations to be voice-recognized or the terms that are voice-recognized.

In this example, "fibromyalgia" is stored as a correction term candidate for "fiber my algae", "pains" is stored as a correction term candidate for "planes", and "Lyrica®" is stored as a correction term candidate for "rear a car".

In this way, pronunciations to be voice-recognized or terms that are voice-recognized, and candidates of correction terms related to the pronunciations to be voice-recognized or the terms that are voice-recognized are read, for each topic, from the storage unit.

Next, the conversation correction unit 9 uses the conversation topic ascertained by the topic ascertaining unit 5 to read correction term candidates from the topic-related correction term storage unit 7 and correct the conversation analyzed by the voice analysis unit 3 (conversation correction step: S105).

In the above-described example, the conversation is corrected, for example, as shown below.

"As a result of examination, there is a strong possibility that the disease you are suffering from is fibromyalgia. Fibromyalgia is an illness accompanied by aches and pains that occur at multiple places throughout the body. I am going to prescribe you Lyrica®, which is an ingestible medicine which alleviates pain caused by fibromyalgia. Please take it two times per day, after breakfast and after dinner."

For example, "rear a car" is a correct term, and thus it could not be corrected by a normal correction engine. However, since the topic of fibromyalgia has been ascertained as described above, the system 1 can make an appropriate correction.

A preferred example of the conversation analysis system further includes the topic information extraction unit 11 which extracts information related to the topic. An example of the topic information extraction unit 11 extracts, from a conversation, terms related to the topic. Another example of the topic information extraction unit 11 reads various data including topic words from various information sites that are connected via the internet, etc. to the system 1, and extracts information (terms) related to the topic from the terms included in the data that was read. Examples of topic-related information include terms that are frequently used in materials or presentations related to the topic. For example, terms which are used in such materials are likely to be accurate terms. Therefore, the topic, which is a term stored in the storage unit, may be read and terms included in a material which includes terms related to the topic may also be read and then stored as information (terms) related to the topic. These terms can also be stored as correction term candidates in the topic-related correction term storage unit 7, or the terms which are already stored therein can be updated.

A preferred example of the conversation analysis system further includes the topic-related term update unit 13 for updating the topic-related correction term storage unit 7. The topic-related term update unit 13 uses information related to each topic input into the system to update the correction term candidates.

For example, the system 1 includes a machine learning program. The machine learning program may store terms that are used often in relation to a topic on the basis of various information and data that has been input into the system in relation to the topic, and then store these terms in the storage unit as correction term candidates. In this way, changes in terminology can be automatically handled, and appropriate correction terms can be automatically updated.

One invention described in the present specification relates to a program for a conversation analysis system. The program causes a computer to function as a voice analysis means, a topic-related correction term storage means, a topic ascertaining means, and a conversation correction means. These means correspond respectively to the units described above.

One invention described in the present specification relates to a computer-readable information recording medium that stores the above-described program. Examples of the information recording medium include a CD-ROM, a DVD, a floppy disk, a memory card, and a memory stick.

INDUSTRIAL APPLICABILITY

The present invention relates to a conversation analysis system, and thus can be utilized in information-related industries.

REFERENCE SIGNS LIST

1: conversation analysis system
3: voice analysis unit
5: topic ascertaining unit
7: topic-related correction term storage unit
9: conversation correction unit
11: topic information extraction unit
13: topic-related term update unit.

The invention claimed is:
1. A conversation analysis system comprising:
a processor embedded in a computer, whereby the processor comprises:
  a voice analysis unit (3) that analyzes content included in a conversation, wherein the voice analysis unit (3) uses the conversation as an input to convert the conversation into digital information, and stores the digital information as a voice-analyzed conversation in a storage unit (39) in a memory of the computer;
  a topic ascertaining unit (5) that ascertains a topic of the conversation, wherein the topic ascertaining unit (5) compares each word in the conversation with each topic word(s) to obtain topic words in the conversation if any word in the conversation matches any of the each topic word(s), and ascertains a topic of the conversation, and wherein the each topic word(s) can be input into the system in advance or stored in a topic dictionary in the storage unit (39);
  a topic information extraction unit (11) that extracts to topic-related information from the conversation which consists of terms related to the ascertained topic obtained from various information websites that are connected via the internet, wherein the terms related to the ascertained topic are stored as candidates of correction terms;
  a topic-related correction term storage unit (7) that stores, for each topic, pronunciations to be voice-recognized or terms that are voice-recognized, and the candidates of correction terms related to the pronunciations to be voice-recognized or the terms that are voice-recognized; and
  a conversation correction unit (9); wherein the conversation correction unit (9) uses the topic of the conversation ascertained by the topic ascertaining unit (5) to read the correction term candidates from the topic-related correction term storage unit (7) and correct the conversation analyzed by the voice analysis unit (3) by correcting any of any lettered word in the voice-analyzed conversation that is incorrect based on the ascertained topic with the candidates of correction terms; and a memory storing a machine learning program to store and automatically update the candidates of correction terms.

2. The conversation analysis system according to claim 1, wherein the processor further comprises:
   a topic-related term update unit (13) for updating the topic-related correction term storage unit (7),
   wherein the topic-related term update unit (13) uses information related to each topic input into the system to update the candidates of correction terms.

3. The conversation analysis system according to claim 1, wherein the terms related to the ascertained topic are accurate terms as the candidates of correction terms that are stored in the topic-related correction term storage unit (7).

4. A method for conversation analysis by means of a conversation analysis system which comprises a processor embedded in a computer, whereby the processor executes steps of:
   analyzing content included in a conversation, using the conversation as an input to convert the conversation into digital information, and storing the digital information as a voice-analyzed conversation in a storage means;
   ascertaining a topic of the conversation, comparing each word in the conversation with each topic word(s) to obtain topic words in the conversation if any word in the conversation matches any of the each topic word(s), and ascertaining a topic of the conversation, and wherein the each topic word(s) can be input into the system in advance or stored in a topic dictionary in the storage means;
   extracting topic-related infirm nation from the conversation which consists of terms related to the ascertained topic obtained from various information websites that are connected via the internet, wherein the terms related to the ascertained topic are stored as candidates of correction terms;
   storing, for each topic, pronunciations to be voice-recognized or terms that are voice-recognized, and the candidates of correction terms related to the pronunciations to be voice-recognized or the terms that are voice-recognized in a topic related correction term storage means;
   correcting the conversation analyzed by correcting any of any lettered word in the voice-analyzed conversation that is incorrect based on the ascertained topic with the candidates of correction terms; and
   storing and automatically updating the candidates of the correction terms by a machine learning program.

5. The method according to claim 4, wherein the terms related to the ascertained topic are accurate terms as the candidates of correction terms that are stored in the storage means.

6. A non-transitory computer readable medium comprising instructions which, when executed by a processor, cause the processor to perform:
   analyzing content included in a conversation, using the conversation as an input to convert the conversation into digital information, and storing the digital information as a voice-analyzed conversation in a storage means;
   ascertaining a topic of the conversation, comparing each word in the conversation with each tonic word(s) to obtain topic words in the conversation if any word in the conversation matches any of the each topic word(s), and ascertaining a tonic of the conversation, and wherein the each tonic word(s) can be input into the system in advance or stored in a topic dictionary in the storage means;
   extracting topic-related information from the conversation which consists of terms related to the ascertained topic obtained from various information websites that are connected via the internet, wherein the terms related to the ascertained topic are stored as candidates of correction terms;
   storing, for each topic, pronunciations to be voice-recognized or terms that are voice-recognized, and the candidates of correction terms related to the pronunciations to be voice-recognized or the terms that are voice-recognized in a topic related correction term storage means;
   correcting the conversation analyzed by correcting any of any lettered word in the voice-analyzed conversation that is incorrect based on the ascertained topic with the candidates of correction terms
   storing and automatically updating the candidates of the correction terms by a machine learning program.

7. The non-transitory computer readable medium according to claim 6, wherein the terms related to the ascertained topic are accurate terms as the candidates of correction terms that are sorted in the storage means.

* * * * *